No. 747,448.　　　　　　　　　　　　　　　PATENTED DEC. 22, 1903.
L. J. LOMASNEY.
GASKET.
APPLICATION FILED AUG. 31, 1903.
NO MODEL.
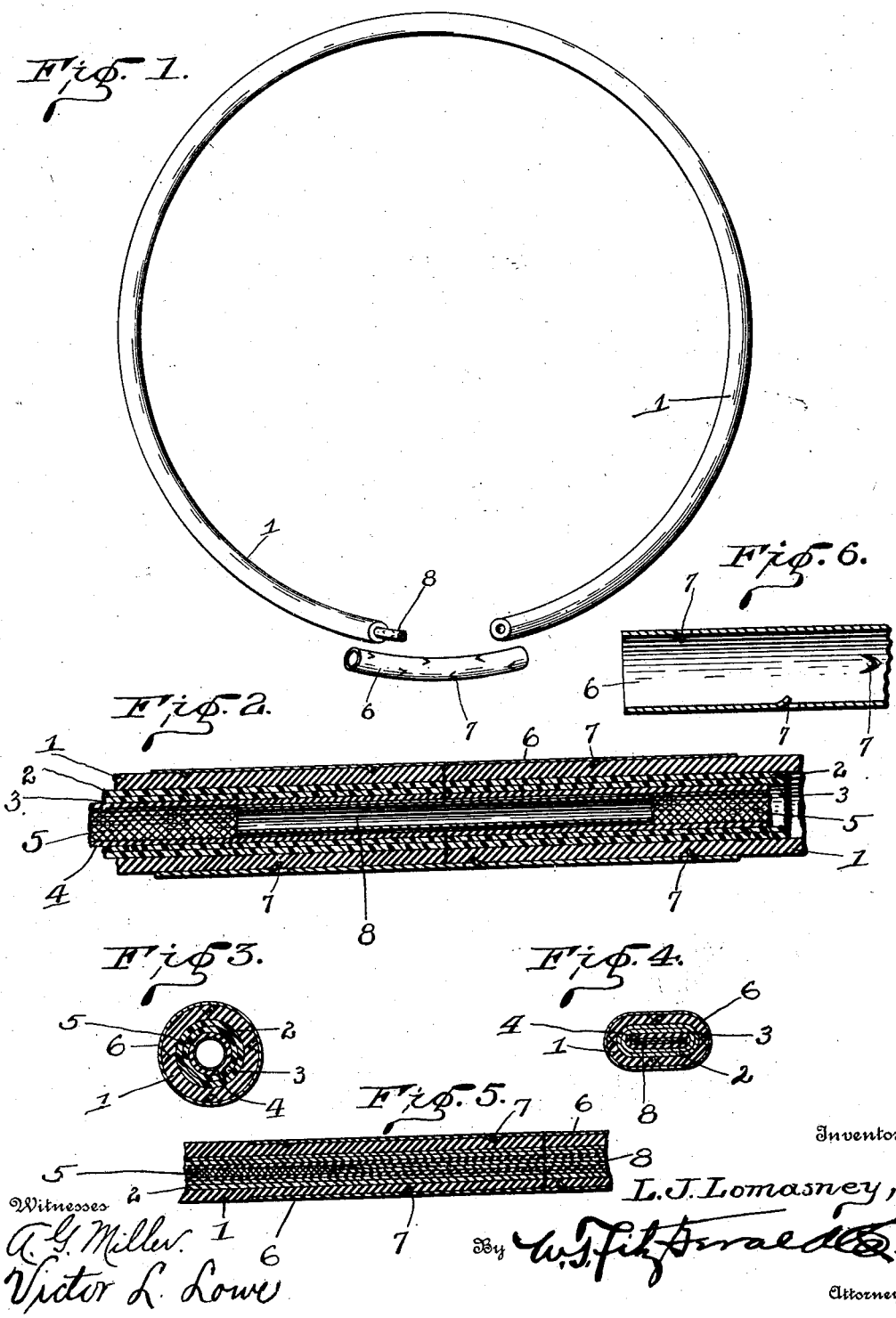
Witnesses
A. G. Miller.
Victor L. Lowe
Inventor
L. J. Lomasney,
By W. J. Fitzgerald
Attorneys No. 747,448.

Patented December 22, 1903.

UNITED STATES PATENT OFFICE.

LEONARD J. LOMASNEY, OF YOUNGSTOWN, OHIO.

GASKET.

SPECIFICATION forming part of Letters Patent No. 747,448, dated December 22, 1903.

Application filed August 31, 1903. Serial No. 171,402. (No model.)

*To all whom it may concern:*

Be it known that I, LEONARD J. LOMASNEY, a citizen of the United States, residing at Youngstown, in the county of Mahoning and State of Ohio, have invented certain new and useful Improvements in Gaskets; and I do hereby declare the following to be a full, clear, and exact description of the invention, such as will enable others skilled in the art to which it appertains to make and use the same.

My invention relates to packing, and more particularly to that form of gasket or packing designed to provide an absolutely steam-tight barrier; and my invention consists of certain novel features of combination and construction of parts, the preferred form whereof will be hereinafter clearly set forth, and pointed out in the claims.

The prime object of my invention, among others, is to provide my improved packing in a continuous form, whereby it may be severed into lengths of proper extent adapted to meet the requirements of any situation, inasmuch as a section of the continuous gasket thus severed may be readily disposed in ring-like form, with the ends thereof abutting each other, it being understood that a plurality of rings of packing may be disposed side by side in cylinders, steam-chests, valves, &c., which when compressed together will cause a more or less perfect coalescence of the several rings and produce practically one impervious or steam-holding gasket and wholly eliminate or reduce to a minimum degree all friction due to the presence of the packing.

A further object of my invention, among others, is to so form a continuous strip of gasket that it will be internally reinforced in such a manner as to enable it to resist all strain placed thereon incident to use and the consequent liability of blowing out under heavy pressure of steam.

A further object is to provide suitable means for uniting the abutting ends of a section of the gasket when disposed in its operative position.

Other objects and advantages will be hereinafter made clearly apparent, reference being had to the accompanying drawings, which are made a part of this application, and in which—

Figure 1 shows a perspective view of my improved gasket complete with the ends disposed in approximation ready to be permanently united. Fig. 2 is a longitudinal central section of a portion of the abutting ends of my gasket after they have been united together. Fig. 3 is a transverse section of Fig. 2. Fig. 4 is a transverse section of Fig. 2 after the latter has been compressed incident to the use thereof. Fig. 5 is a longitudinal section showing the abutting ends of my gasket after the same have been brought together and secured and afterward compressed as illustrated in Fig. 4. Fig. 6 is a detail view showing a longitudinal section of a portion of the coupling or uniting ferrule designed to hold the abutted ends of my gasket together.

For convenience the various details of my invention and coöperating accessories will be designated by numerals, the same numeral applying to a similar part throughout the several views.

Referring to the numerals on the drawings, 1 indicates the outer tubular section of my gasket, which is preferably formed of rubber, while 2 and 3 designate two interfitting tube-like sections of canvas, having properly incorporated therewith the requisite quantity of rubber or similar cohesive substance, whereby said parts will be reliably united together, while within the tubular section 3 I locate a soft-rubber tube 4, and immediately within said rubber tube I dispose a reinforcing meshed wire tube 5, whereby when my entire gasket has been compressed and caused to collapse the woven-wire reinforcing tubular section 5 will become completely embedded in the rubber tubular section 4, and as the meshed tubular section 5 is preferably formed of copper wire great strength and reinforcement of the parts will be attained, thereby making it practically impossible for any pressure of steam incident to the use of the gasket to destroy the same, as by blowing out a section thereof. Inasmuch as the outer tubular section 1 is also formed of soft rubber, it follows that when a plurality of my gaskets are located side by side and compressed together they will under action of heat perfectly unite with each other, thereby insuring that the gaskets thus disposed will comprise substantially one single piece built up of several sections, each section being reliably reinforced internally by its meshed copper-wire tube 5. Since a gasket of any desired circumference may be provided by simply cutting off a part of the continuous gasket of such length as may be required, it follows that a more perfectly fitting gasket may be produced for any given situation.

It becomes very desirable and important to provide suitable means for securing the abutted ends of a section of gasket, and with this purpose in view I provide the ferrule or tubular coupling 6 of proper size to receive the contiguous ends of the gasket, whereby they may be brought together at a point immediately midway between the ends of said coupling, and since the tubular coupling 6 is formed of copper the result will be that under the pressure and heat incident to the use of my gasket said coupling will be compressed and will vulcanize or unite with a contiguous part of the rubber covering 1, thereby establishing a permanent union between said parts. To insure a more perfect union, I prefer to provide the tubular coupling 6 with a plurality of inwardly-directed teeth, as indicated by the numeral 7, of such character and size as to permit them to ride over the surface of the rubber tubular covering 1 when the coupling is slipped over the end thereof, but will prevent a reverse movement or withdrawal of said coupling, as will be readily understood. When a plurality of my improved gaskets have thus been formed and united and compressed together incident to the use thereof, the action of the heat and compression will completely collapse the coupling 6 and the meshed copper-wire tube 5, thereby causing the rubber walls of the internal tubular section 4 to become incorporated with or directed into the meshes of said wire tube, thereby very reliably reinforcing the strengh of the gasket. In order to still further reinforce the united ends of the gasket, I provide the tubular section 8, preferably of some yielding collapsible material, as lead, copper, or the like, having a number of outwardly-directed points upon its surface of such size as to permit its free introduction into the uncollapsed or open end of the meshed wire tube 5 and the rubber tubular section 4, and it therefore follows that when said parts are collapsed under pressure the tubular connecting-link 8 will also be collapsed and the outwardly-directed points thereon will take into a contiguous mesh of the wire-tube reinforcement 5, and thus insure against casual withdrawal of said tube and the incident opening of the joint.

It will thus be seen that I have provided a very reliable form of gasket, which, as hereinbefore stated, may be at comparatively low cost manufactured in quantities, inasmuch as it is formed in one continuous piece to be severed into lengths of the desired extent as required for use, and while I have described the preferred combination and construction of parts I wish to comprehend all substantial equivalents and substitutes that may be considered as falling fairly within the scope of my invention.

What I claim as new, and desire to secure by Letters Patent, is—

1. The herein-described juncture or connecting-link for the ends of a gasket, comprising a suitable tubular member 6 to receive the ends of the gasket and provided with inwardly-directed frictional devices designed to become embedded in the surface of the gasket, in combination with a collapsible tubular member 8 to be inserted in the bore of the gasket and having means upon its outer surface to enter the meshes of the centrally-disposed reinforcing member 5 whereby, when the parts are collapsed or compressed together, said coöperating parts will become permanently united, substantially as specified and for the purpose set forth.

2. A gasket composed of an outer covering of rubber or other yielding material and also having a tube or tubes of canvas or the like, surrounded by said outer covering and an inner flexible tube of rubber or the like having therein a tube of meshed wire adapted to become embedded in the walls of the inner rubber tube when the gasket is collapsed, whereby the gasket will be reinforced or strengthened, and suitable means to unite the abutted ends of the gasket comprising a tubular thimble 6 having a frictional inner surface and a collapsible tubular member 8 having a frictional outer surface, said member 8 fitting the bore of the gasket, substantially as and for the purpose set forth.

In testimony whereof I affix my signature in presence of two witnesses.

LEONARD J. LOMASNEY.

Witnesses:
S. W. LUCE,
JNO. CLIFFORD.